United States Patent [19]

Stein

[11] 4,421,975

[45] Dec. 20, 1983

[54] HEATING ELEMENT ASSEMBLY

[75] Inventor: John Stein, Fruitland, Wash.

[73] Assignee: Kim Hotstart Mfg. Co., Inc., Spokane, Wash.

[21] Appl. No.: 340,182

[22] Filed: Jan. 18, 1982

[51] Int. Cl.3 ........................... H05B 3/06; F16L 3/22

[52] U.S. Cl. .................................... 249/335; 219/336; 219/306; 219/320; 219/536; 248/68 R; 338/242; 338/217

[58] Field of Search ............... 219/335, 336, 306, 316, 219/318, 321, 320, 437, 523, 536; 248/68 R, 68 CB; 174/151, 146, 157; 338/217, 228, 229, 242

[56] References Cited

U.S. PATENT DOCUMENTS

| | | | |
|---|---|---|---|
| 276,190 | 4/1883 | Mehaffey | 248/68 R |
| 1,535,776 | 4/1925 | Hollister | 219/316 |
| 1,845,692 | 2/1932 | Willat | 219/318 |
| 2,165,087 | 7/1939 | Alford | 174/146 |
| 2,963,539 | 12/1960 | Hynes | 174/157 |
| 2,977,405 | 3/1961 | Warnock | 174/146 |
| 3,408,280 | 10/1968 | Preiser | 174/151 |
| 4,244,542 | 1/1981 | Mathews | 248/49 |

FOREIGN PATENT DOCUMENTS

| | | | |
|---|---|---|---|
| 39467 | 4/1981 | European Pat. Off. | 248/68 R |
| 1102994 | 3/1961 | Fed. Rep. of Germany | 219/335 |
| 2204465 | 8/1973 | Fed. Rep. of Germany | 248/68 CB |
| 1566861 | 3/1969 | France | 248/68 R |
| 52-42292 | 4/1977 | Japan | 248/68 CB |

*Primary Examiner*—B. A. Reynolds
*Assistant Examiner*—Teresa J. Walberg
*Attorney, Agent, or Firm*—Wells, St. John & Roberts

[57] ABSTRACT

An immersion heater having the bent legs of the individual electrical elements joined to a wall by a press fit between tapered element surface and tapered wall apertures. A movable brace interconnects the element legs and dampens vibration.

10 Claims, 7 Drawing Figures

HEATING ELEMENT ASSEMBLY

TECHNICAL FIELD

This disclosure relates to direct immersion liquid heaters of the electrical resistance type.

BACKGROUND OF THE INVENTION

This invention arose from an effort to improve the life of longitudinally extended direct immersion heaters, where relatively long lengths of resistance heating elements are supported from a side wall of a liquid container. Existing heating units of this type typically have heating elements joined to the supporting wall by brazing. Joining dissimilar metals in this manner subjects them to the possibility of joint failure due to thermal expansion of the materials and vibrational movement. Where the elements are mounted by brazing, the ends of the elements outside the liquid area must also be sealed to produce an explosion proof or liquid type seal. Such sealing materials again are subjected to material failure due to vibration and temperature changes. The present invention both minimizes vibration and improves the seal to assure longer element life under actual working conditions.

BRIEF DESCRIPTION OF THE DRAWINGS

A preferred embodiment of the invention is illustrated in the accompanying drawings, in which.

DESCRIPTION OF THE PREFERRED EMBODIMENT

Figure 1:
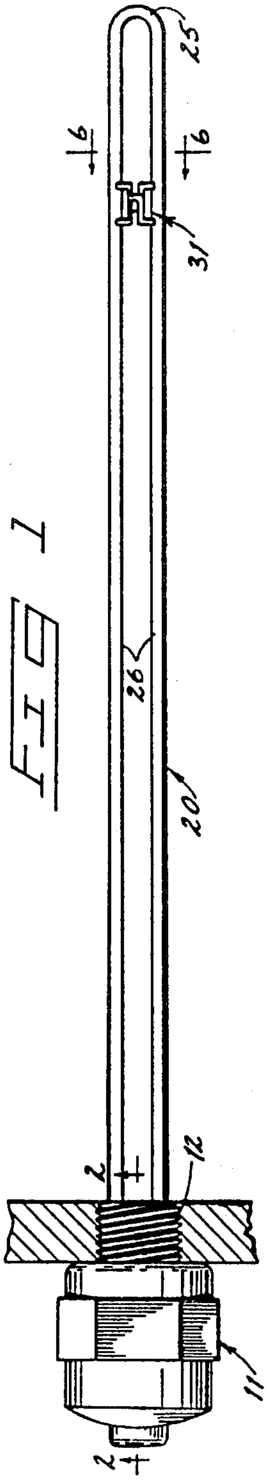
FIG. 1 is a side elevation view of the heating element assembly.

In accordance with the constitutional purpose of the Patent Laws of promoting the progress of science and useful arts (Article 1, Section 8), applicant submits the following disclosure of this invention illustrated by a preferred embodiment as shown in FIGS. 1 through 7. The improvement in element life is achieved by a combination of tapered element surface areas and mating apertures in the support wall for the element plus the provision of a brace which interlocks two or more elongated bent elements and is movable supported by them to serve as a vibration dampener.

The connection between the elements 20 and end wall 10 of a supporting enclosure for the heater includes tapered outer surface areas 27 formed along the outer end of the element 20. Complementary tapered apertures 28 are formed through end wall 10 in engagement with the tapered outer surface areas 27.

The brace basically comprises a partition 31 having a pair of oppositely facing outer edges 32. Each outer edge 32 has a plurality of recesses 33 formed across it for individually engaging an equal number of heating elements legs. This engagement assures that the partition 31 is maintained in a position that is perpendicular to the heating element legs. Partition 31 is free to move parallel to the heating element legs in response to their vibration.

The combination of these improvements assures long life of the elements 20 and overcomes the usual structural weakness of heating element supports.

The tapered fit eliminates brazing which is commonly employed today. The brazing of elements to a supporting wall structure creates problems because of the dissimilar metals which must be joined, such as copper and steel. The brazing materials themselves tend to crack during use of the heating element, as a result of thermal expansion and vibrational stresses. Brazing of elements inserted through a wall structure requires that the elements be sealed at both sides of the wall to produce an explosion proof or liquid type seal. These sealing materials also create maintenance problems because of the thermal and structural stresses to which they are subjected.

Heating elements of the type illustrated are often used to warm fluids in internal combustion engines or associated equipment located on vehicles. They are subjected to constant movement and vibrational stresses. This is particularly a problem when two or more elements are mounted on the structure, since the elongated heating elements can vibrate to the point that they strike one another. This leads to substantial damage and greatly shortens the expected life of the elements. To overcome the vibrational damage both to the elements and to their mount on the supporting wall structure, the present disclosure provides a vibrational damper or brace which interlocks the elements to one another. It is movable along the lengths of the elements to prevent individual vibration or movement of any one element. The movement of the brace automatically seeks a common node or average node of vibration and shifts in position along the elements in response to changes in vibrational parameters. As a result, individual vibration of the elements is dampened and the multiple elements on a common wall vibrate in unison at a much smaller amplitude than they would individually. This greatly increases the life of the elements and reduces damage to them and to the interconnection between the elements and the mounting wall.

Referring now to the drawings, which illustrate details of a preferred embodiment incorporating the improvements in combination, there is shown an immersion heater of the electrical resistance type, which is removably mounted by an end wall 10 of a screw plug enclosure 11. Mounting threads 12 surrounding wall 10, and bottom out at a radial shoulder 14 which abuts the outer surface of a supporting wall 19 of an engine, vessel or other liquid enclosure through which the immersion heater is projected.

The outer portion of the screw plug enclosure 11 includes an interior recess 15 within which the electrical connections for the heater area made. It is typically covered by a removable lid 18. Lid 18 can be threaded to enclosure 11 or can be attached in any other suitable manner.

The end wall 10 which mounts the heating elements 20 includes parallel outer surface 16 and inner surface 17. The two surfaces 16 and 17 are axially spaced a distance sufficient to provide proper mounting contact with the elements 20.

Figure 3:
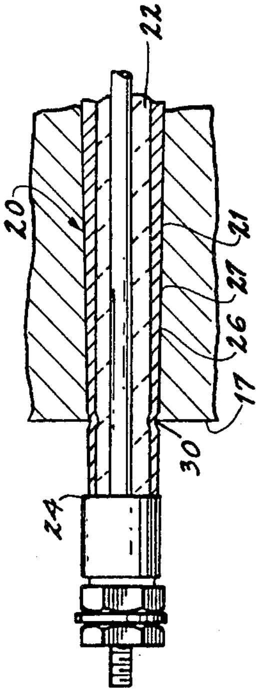
FIG. 3 is an enlarged sectional view through a single element as seen along line 3—3 in FIG. 2.

As can be seen specifically in FIG. 3, each heating element 20 is typically manufactured as an outer tubular sheath 21, an interior coaxial resistance wire 23, and interposed insulation 22, which is typically a ceramic material. Such heating element structures are well known and conventional in this area of technology.

Each heating element 20 is bent in a "hairpin" configuration which is U-shaped. Each element 20 includes a pair of substantially parallel legs 26 joined by a U-shaped bend 25 at one end of element 20 and open ends 24 at its opposite end. There can be one, two, three or more elements 20 mounted on an individual wall 10 of enclosure 11. The drawings illustrate a typical multiple element assembly including three elements 20 for illustration purposes. Each element 20 is arranged on the wall 10 parallel to the others, the elements 20 being identical in structure.

Figure 4:
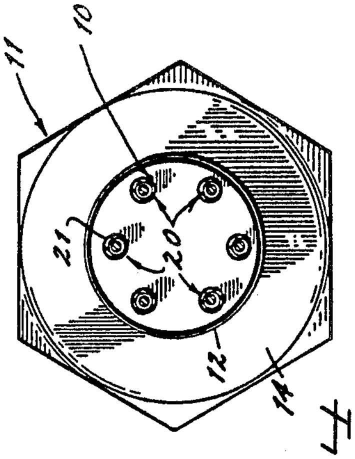
FIG. 4 is a sectional view taken along line 4—4 in FIG. 2.
Figure 2:
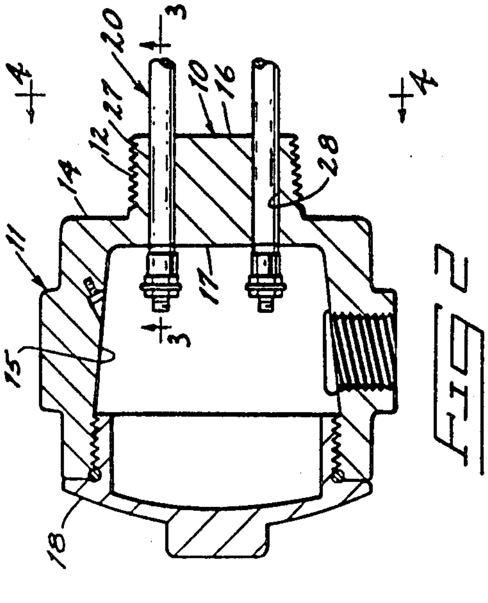
FIG. 2 is an enlarged sectional view taken along line 2—2 in FIG. 1.
Figure 5:
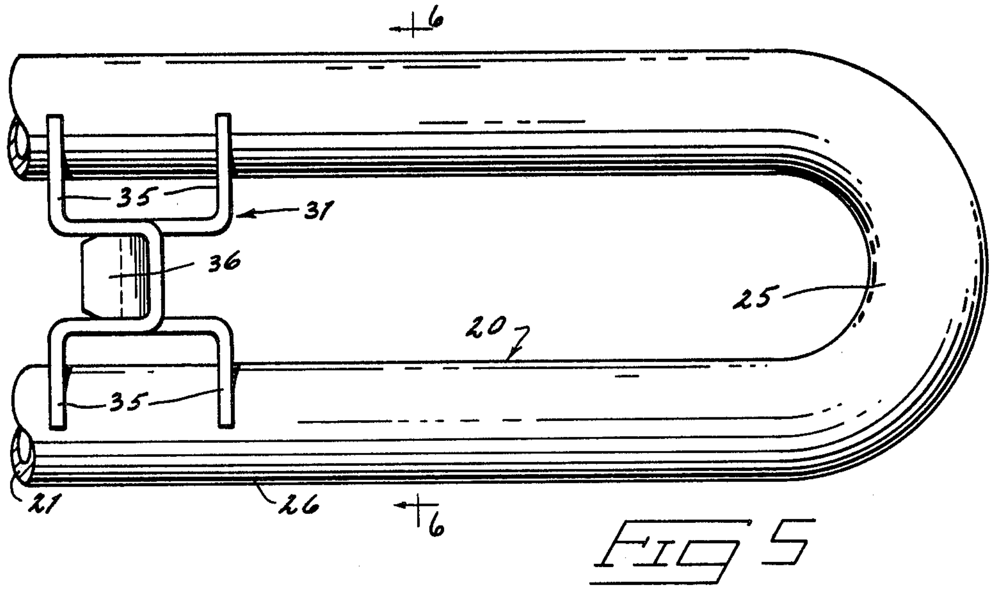
FIG. 5 is an enlarged side view at the outer ends of the heating elements.
Figure 6:
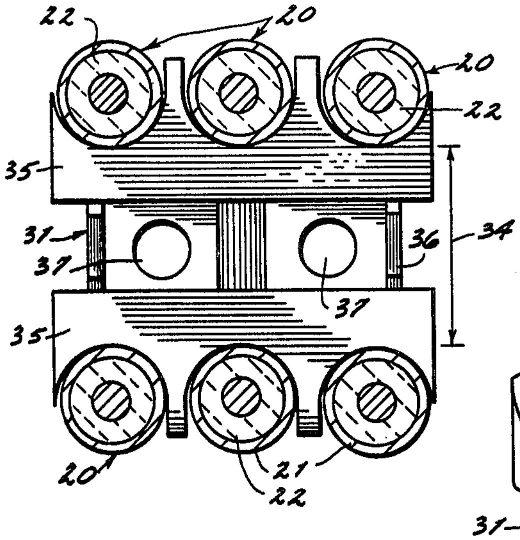
FIG. 6 is an enlarged sectional view taken along line 6—6 in FIG. 5.

The manner by which the elements 20 are attached to end wall 10 can be best seen in FIGS. 2 through 4. Each element 20 has a tapered outer surface area 27 formed adjacent to its two open ends 24. The surface areas 27 mate in tapered apertures 28 formed through the thickness of end wall 10 complementary to the configuration of the heating elements. The tapered outer surface areas 27 and tapered apertures 28 are formed complementary to one another for a very tight press fit.

While it is not mechanically essential for proper fitting of the elements 20 within end wall 10, they are further secured by an annular recess 30 which is formed about each element 20 at the outer ends of the surface areas 27. When assembled, the annular recesses 30 are substantially coplanar with inner surface 17 of wall 10. The material of wall 10 can be mechanically upset into the recess 30 to provide a mechanical interlock between element 20 and end wall 10 (see FIG. 3).

Because the multiple elements 20 are typically subjected to varying vibrations during use, the expected life of the mount provided between wall 10 and elements 20 is increased by limiting vibrational movement. This is accomplished by the brace shown in detail in FIGS. 5 through 7.

Figure 7:
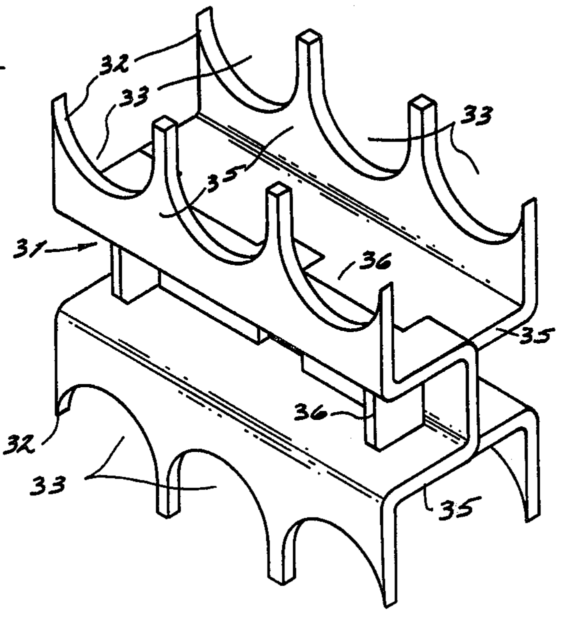
FIG. 7 is a perspective view of a brace.

The partition or brace 31 which is movably mounted between the elements 20 includes oppositely facing outer edges 32 having multiple recesses 33 formed across them complementary to the spacing of elements 20. Partition 31 preferably is made from sheet material. The outer edges 32 are preferably formed across spaced parallel plates 35 at each side of the partition 31. These spaced plates 35 can be individually stamped with interfitting center portions that can be connected by a joining plate 36 inserted between their central portions and bent to prevent its removal (FIG. 7). The center portions of plates 35 include apertures 37 which assure liquid flow through partition 31.

The separation between the bases of aligned recesses 33 is indicated by line 34. This separation is substantially equal to the spacing between the legs 26 of each element 20. The spacing 34 need only be an approximation of the spacing between the legs 26, since a loose fit between partition 31 and the legs 26 is desirable. This loose connection assures that partition 31 is free to move longitudinally along the legs 26 of the elements 20.

To assemble the immersion heater, the elements 20 are press fit within the wall 10 of enclosure 11. This results in a tight surface-to-surface engagement between the tapered outer surface areas 27 of the elements 20 and the receiving tapered apertures 28 of end wall 10. A conventional sealing compound can be applied to one or both of these mating surfaces for further assuring that they remain in a locked condition. When desired, the material of the inner surface 17 of end wall 10 can be upset within the annular recesses 30 on elements 20.

After the elements 20 have been fit on the end wall 10, partition 31 can be placed between the legs 26 of the elements 20. The parallel legs 26 of each element 20 straddle the aligned recesses 36 of the partition 21. The specific placement of partition 31 is not important, so long as it is constructed so as to be loosely engaging each of the elements 20. When subjected to vibrational forces, partition 31 will automatically seek a vibrational node or an average vibrational node for multiple elements 20. The partition 31 will constantly move toward such a node and thereby dampen the individual vibration to which the elements 20 would otherwise be subjected. The result will be a unitary vibrational movement of the several elements 20, which will have an amplitude less than that which would otherwise be developed in any of the elements.

The materials of the various parts of this apparatus are of no substantial consequence to the basic interrelation between them. For instance, the partition 31 is shown as it would be fabricated from light sheet metal, but it could be molded or formed from plastic material capable of withstanding the temperatures to which the immersion heater would be subjected. Likewise, the enclosure 11 can be machined or cast of any suitable metal or alloy.

This description of a preferred embodiment of the invention has been presented for purposes of illustration and example. It is not intended to be exhaustive or to limit the invention to the precise form disclosed. It is intended that the scope of the invention be defined by the following claims.

I claim:

1. A brace for interlocking a group of elongated heating elements each having two legs arranged substantially parallel to one another and joined by a U-shaped bend at one end of the element, said legs being fixed to a supporting wall at the remaining end of the element, the brace comprising:

a partition having oppositely facing outer edges each having a plurality of recesses formed across them complementary to the spacing of the element legs for loosely engaging an equal number of element legs along each of its outer edges while perpendicular to the heating element legs, said partition being free to move parallel to the element legs in response to their vibration to an average vibrational node for the plurality of elements.

2. The brace of claim 1 wherein the partition comprises a pair of parallel walls having said recesses formed across spaced outer edges at opposite sides of the partition.

3. The brace of claim 1 wherein each of said outer edges are formed across a pair of spaced walls.

4. The brace of claim 3 wherein the spaced walls of the partition are individually made from light sheet materials.

5. The combination of:

an immersion-type liqud heater having a plurality of elongated heating elements each having a pair of legs bent in an elongated U-shaped configuration at one end of the element, and with open ends at the remaining end of the element supported in a plug wall; and a brace for loosely interlocking the heating elements, said brace comprising:

a unitary partition having oppositely facing outer edges with a plurality of recesses formed across them complementary to the spacing of the element legs for loosely engaging an equal number of element legs along each of its outer edges;

said partition being movably mounted perpendicularly between the legs of each element in loose engagement with the legs for dampening vibration in the elements by moving freely along the element legs to an average vibrational node for the plurality of elements.

6. The apparatus of claim 5, wherein the partition outer edges are each formed across spaced parallel plates.

7. The apparatus of claim 1 wherein there are three heating elements and three recesses formed across each outer edge of the partition.

8. The apparatus of claim 1 wherein there are three heating elements and three recesses formed across each outer edge of the partition;

each heating element being arranged along the partition with its legs straddling the outer edges in substantially parallel positions.

9. The apparatus of claim 1 wherein there are three heating elements and three recesses formed across each outer edge of the partition;

each heating element being arranged along the partition with its legs straddling the outer edges in substantially parallel positions;

the separation of the bases of corresponding recesses between the outer edges of the partition being slightly greater than the separation between the legs of each heating element at their respective ends.

10. An extended-life heating element assembly of the type including electrical resistance heating elements extending from a supporting wall end wherein the heating elements each comprise two substantially parallel legs joined by a U-shaped bend at one end of the element and by two open ends at its opposite end, comprising:

a tapered outer surface area formed along the open ends of each element;

complementary tapered apertures formed through the end wall in engagement with the tapered outer surface areas of the elements;

a partition having a pair of oppositely facing outer edges each having a plurality of recesses formed across them complementary to the spacing of the element legs for loosely engaging an equal number of heating element legs along each of its outer edges while perpendicular to the heating element legs, said partition being free to move parallel to them in response to their vibration to an average vibrational node for the plurality of elements.

* * * * *